United States Patent
Chapman et al.

(10) Patent No.: US 8,622,045 B2
(45) Date of Patent: Jan. 7, 2014

(54) ACTIVE AIR CONTROL

(75) Inventors: Kirby S. Chapman, Manhattan, KS (US); Diana K. Grauer, McPherson, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 1074 days.

(21) Appl. No.: 12/570,710

(22) Filed: Sep. 30, 2009

(65) Prior Publication Data
US 2010/0077982 A1   Apr. 1, 2010

Related U.S. Application Data

(60) Provisional application No. 61/101,957, filed on Oct. 1, 2008.

(51) Int. Cl.
*F02D 9/10*   (2006.01)

(52) U.S. Cl.
USPC .......................................... 123/442; 123/336

(58) Field of Classification Search
USPC ............................. 123/442, 184.34–184.36, 123/184.41–184.44, 184.47–184.49, 336, 123/337, 586, 403
See application file for complete search history.

(56) References Cited

U.S. PATENT DOCUMENTS

| | | | | |
|---|---|---|---|---|
| 5,056,474 A | * | 10/1991 | Tezuka et al. | 123/184.38 |
| 5,080,065 A | * | 1/1992 | Nomura et al. | 123/403 |
| 5,377,654 A | * | 1/1995 | LoRusso et al. | 123/673 |
| 2002/0100466 A1 | * | 8/2002 | Miller et al. | 123/672 |

FOREIGN PATENT DOCUMENTS

| | | | | |
|---|---|---|---|---|
| JP | 01193038 A | * | 8/1989 | ................ F02D 9/02 |
| JP | 02291464 A | * | 12/1990 | .............. F02D 45/00 |

OTHER PUBLICATIONS

U.S. Appl. No. 12/243,833, filed Oct. 1, 2008, entitled Turbocharager Booster System; Inventors: Kirby Chapman, et al.
U.S. Appl. No. 12/243,816, filed Oct. 1, 2008, entitled Variable Geometry Turbocharger; Inventors; Kirby Chapman, et al.
Kansas State University—National Gas Machinery Laboratory Article entitled "Development of a Turbocharger Booster System", Published Oct. 3, 2007 and written by Kirby S. Chapman, Ph.D., et al. (17 pages).
Kansas State University—National Gas Machinery Laboratory Slide Show entitled "Development of a Turbocharger Boosting System", Published Oct. 3, 2007 and written by Kirby S. Chapman, Ph.D. et al. (25 pages).
Kansas State University Article entitled "Development of the Charge Air Integrated Manifold Engine Numerical Simulation (CAIMENS) for Active Air Control System Implementation" Published Oct. 1, 2007 and written by Diana K. Grauer, B.S.M.E. et al. (17 pages).
Kansas State University Slide Show entitled "Development of the Charge Air Integrated Manifold Engine Numerical Simulation (CAIMENS) for Active Air Control System Implementation" Published Oct. 3, 2007 and written by Diana K. Grauer, B.S.M.E. et al.

* cited by examiner

*Primary Examiner* — Rinaldi Rada
*Assistant Examiner* — Hung Q Nguyen
(74) *Attorney, Agent, or Firm* — Hovey Williams LLP

(57) ABSTRACT

An air-balanced engine assembly is configured to operate efficiently while producing a reduced level of harmful emissions. The engine assembly includes a two-stroke internal combustion engine with multiple power cylinders and intake and exhaust manifolds that fluidly communicate with the cylinders. The engine assembly also includes an air balancing assembly with valves that control intake air flow from the intake manifold to the cylinders. The valves cooperate to balance intake air flow among the cylinders and are configured to substantially equalize trapped equivalence ratios among the cylinders.

10 Claims, 7 Drawing Sheets

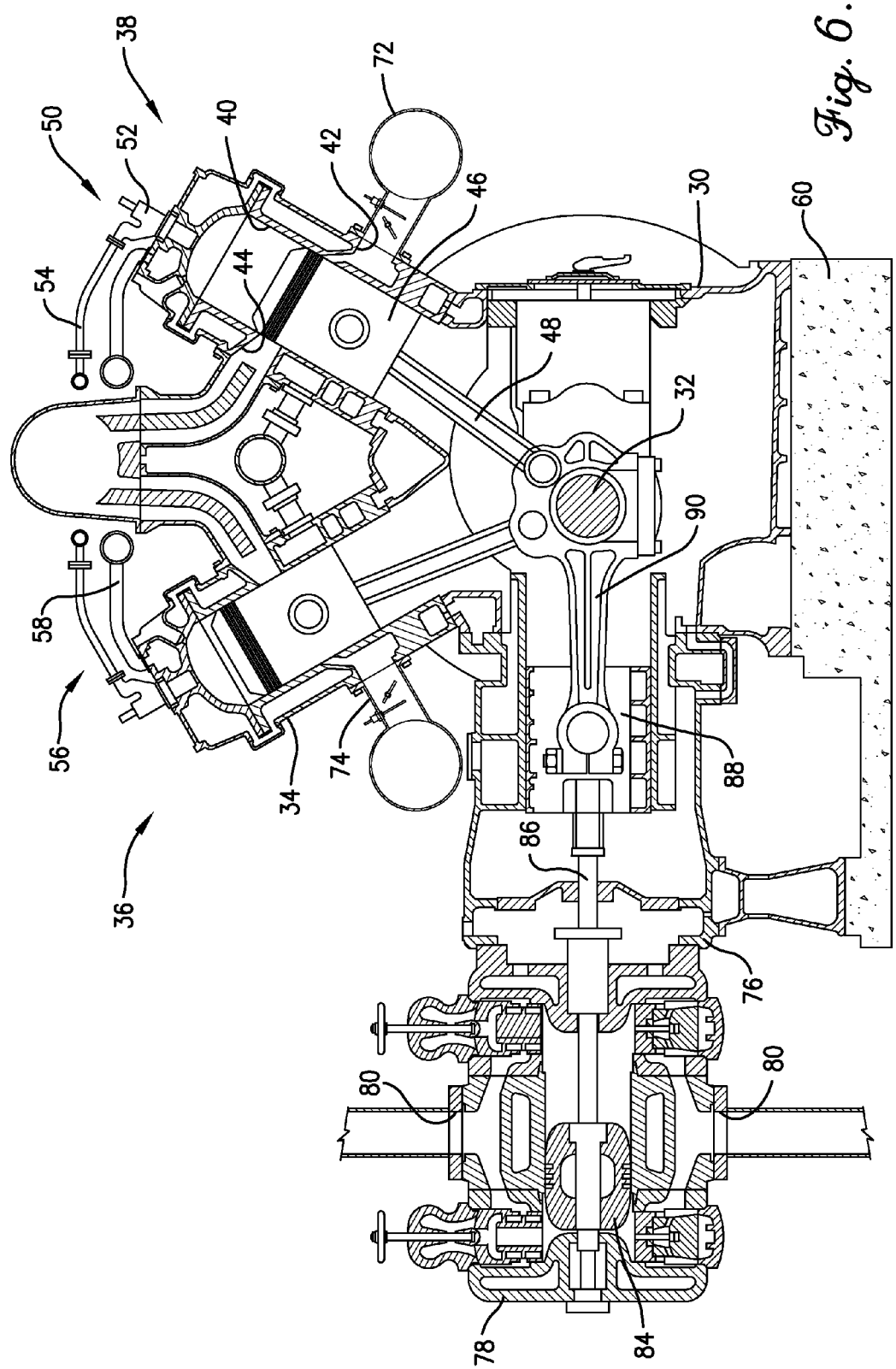

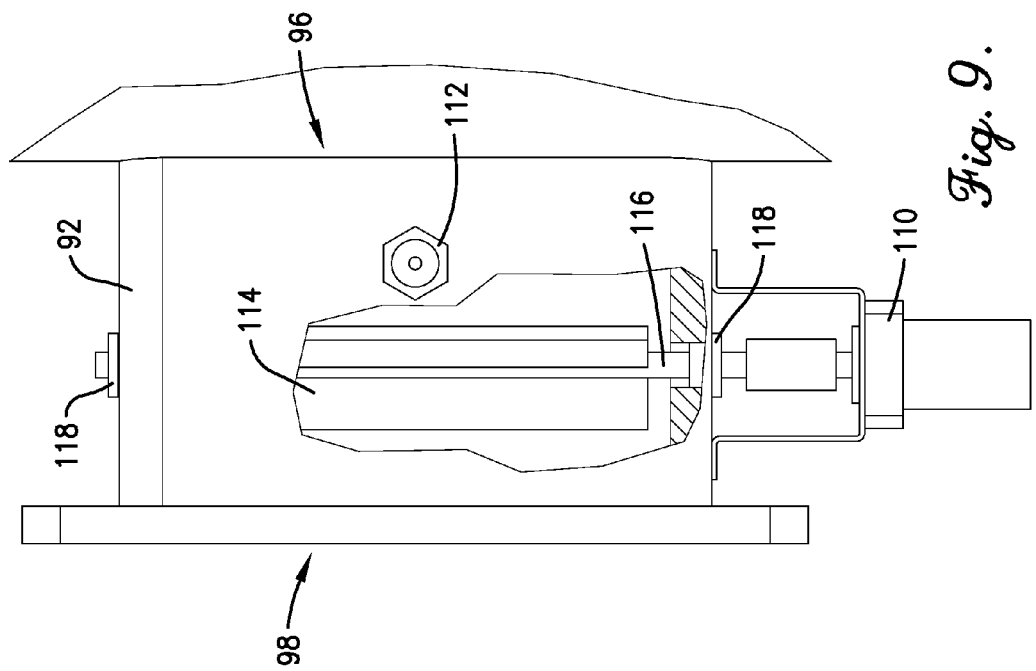
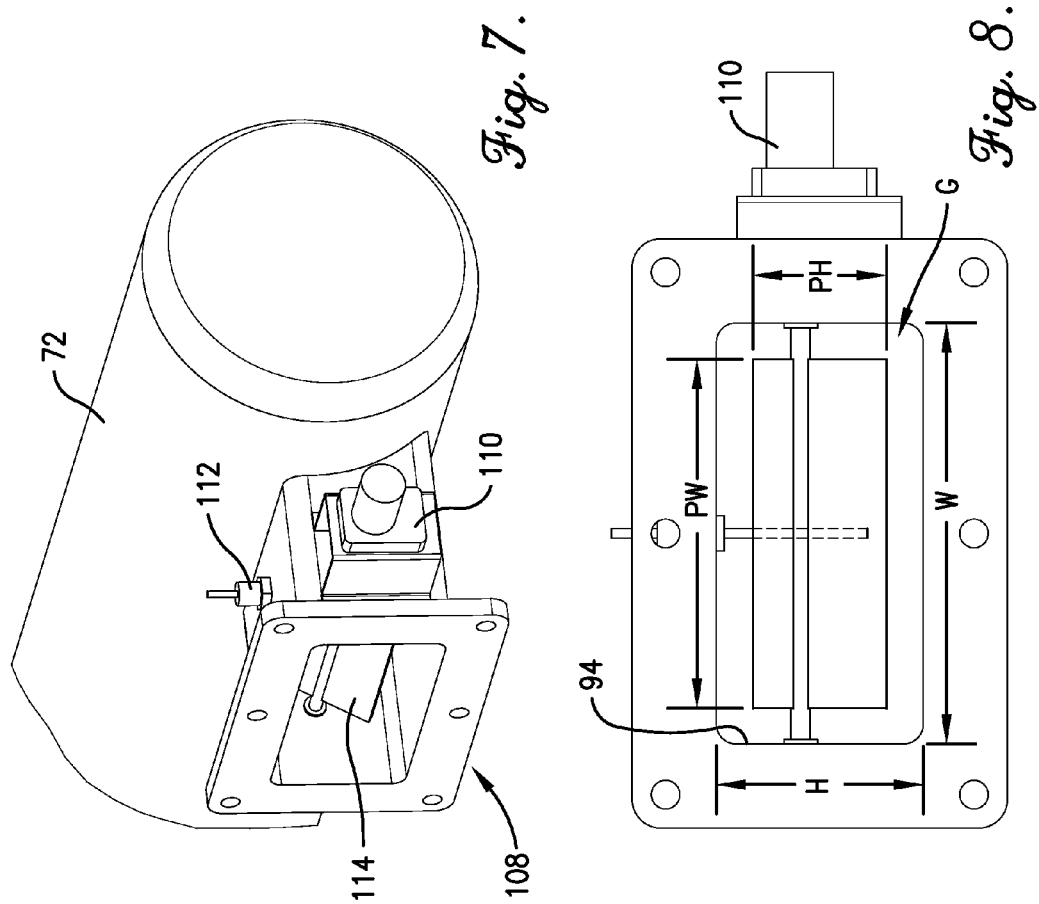

ACTIVE AIR CONTROL

CROSS REFERENCE TO RELATED APPLICATION

This application claims the benefit of Provisional Application No. 61/101,957, which was filed on Oct. 1, 2008 contemporaneously with application for U.S. patent Ser. No. 12/243,833, entitled TURBOCHARGER BOOSTER SYSTEM, and application for U.S. patent Ser. No. 12/243,816, entitled VARIABLE GEOMETRY TURBOCHARGER. All of the foregoing are hereby incorporated in their entirety by reference herein.

BACKGROUND

1. Field

The present invention relates generally to reciprocating internal combustion engines. More specifically, embodiments of the present invention concern a reciprocating engine and a cylinder balancing system that equalizes trapped equivalence ratio among power cylinders of reciprocating engines.

2. Discussion of Prior Art

Large bore reciprocating internal combustion engines have long been used to provide power in various applications, such as electrical power generation, maritime power generation, and other industrial applications. For instance, large bore reciprocating engines are ubiquitous throughout the natural gas transmission industry as a source of power for large natural gas compressors. A vast number of legacy reciprocating engines have been in operation for at least 50-60 years, due in part to their reliability and the high cost of replacement.

Although functionally reliable, prior art large bore reciprocating engines used for natural gas compression suffer from various limitations. In particular, legacy reciprocating engines typically fail to meet current federal emissions regulations and operational efficiency requirements. As originally configured by manufacturers, legacy reciprocating engines generally produce an unacceptable amount of $NO_X$ emissions. Furthermore, aftermarket systems designed for legacy engines, and intended to reduce harmful emissions, fail to sufficiently improve performance. For instance, aftermarket fuel control systems are integrated into legacy engines to balance peak cylinder pressure across multiple cylinders, but generally cannot effectively reduce $NO_X$ emissions.

SUMMARY

Embodiments of the present invention provide an air-balanced engine that does not suffer from the problems and limitations of the prior art engines set forth above.

A first embodiment of the present invention concerns a reciprocating internal combustion engine which broadly includes a plurality of combustion cylinders, an intake manifold, and a plurality of independently variable air balancing valves. The plurality of combustion cylinders are spaced along an engine axis, with each of the combustion cylinders having a combustion chamber and an intake port that fluidly communicates with the combustion chamber to permit a flow of intake air into the combustion chamber. The intake manifold is in fluid communication with the intake ports and is configured to supply intake air for the intake ports. The plurality of independently variable air balancing valves are each in fluid communication with the intake manifold and configured to control the flow of intake air from the intake manifold through a respective intake port. Each air balancing valve is configured to divert intake air not passing into the respective intake port to another intake port via the intake manifold.

A second embodiment of the present invention concerns a method of operating a reciprocating internal combustion engine to substantially equalize trapped equivalence ratio among a plurality of power cylinders. The method broadly includes the steps of determining an operational air flow rate of each of the intake air flows received by corresponding power cylinders during substantially steady-state engine operation, comparing the determined operational air flow rates, and adjusting an air balancing system in response to the comparison step to change the operational air flow rate of at least one of the power cylinders relative to another of the power cylinders.

A third embodiment of the present invention concerns a method of distributing intake air among a plurality of power cylinders in a reciprocating internal combustion engine. The method broadly includes the steps of locating air intake valves between the intake manifold and a respective power cylinder, and adjusting the air intake valves to control intake air flow to the intake port of each power cylinder and thereby balance intake air flow among the power cylinders.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein.

Figure 1:
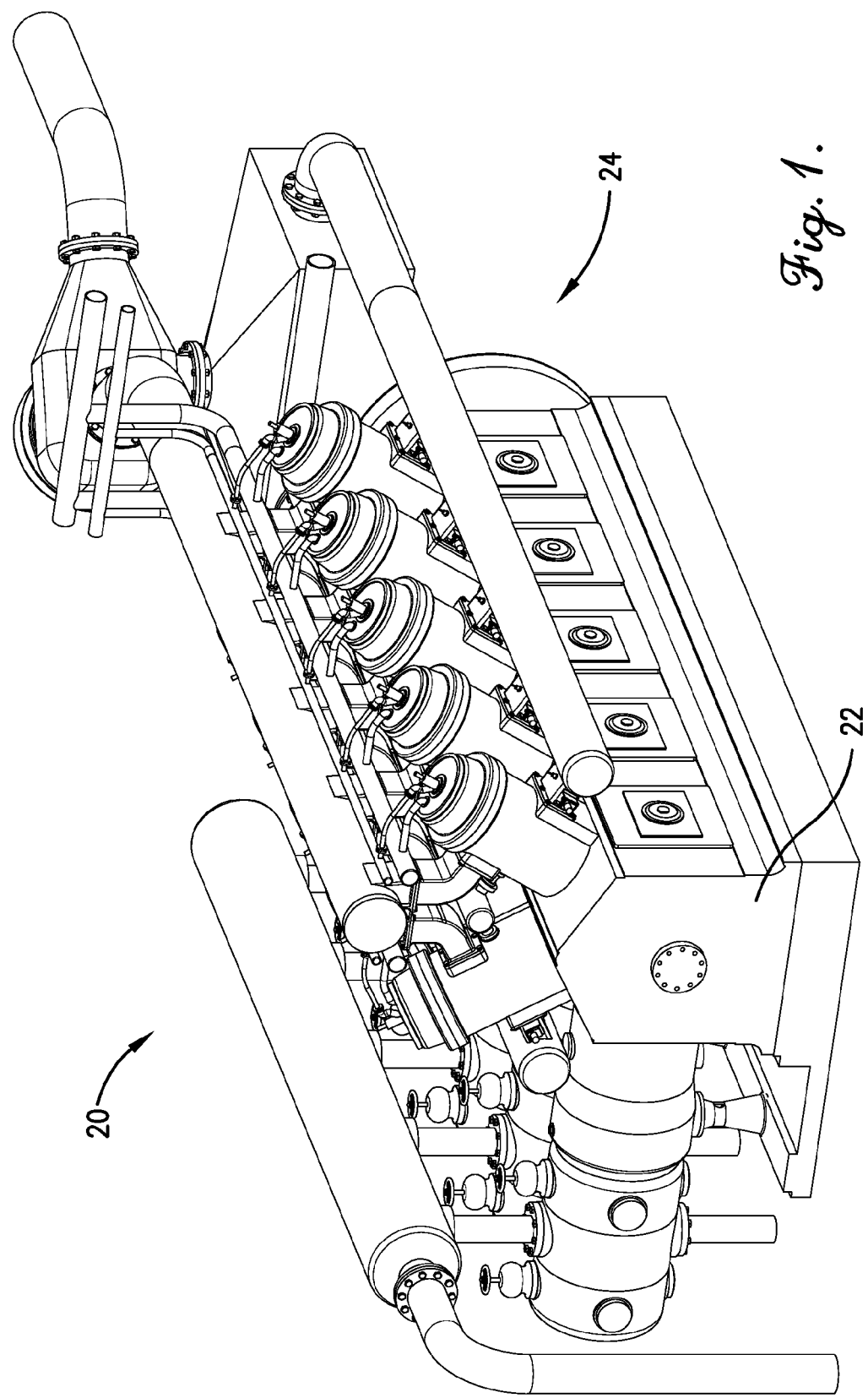
FIG. 1 is a right front perspective of an air-balanced two-stroke engine constructed in accordance with a preferred embodiment of the present invention, with the engine including an integral gas engine-compressor and an air balancing system.
Figure 2:
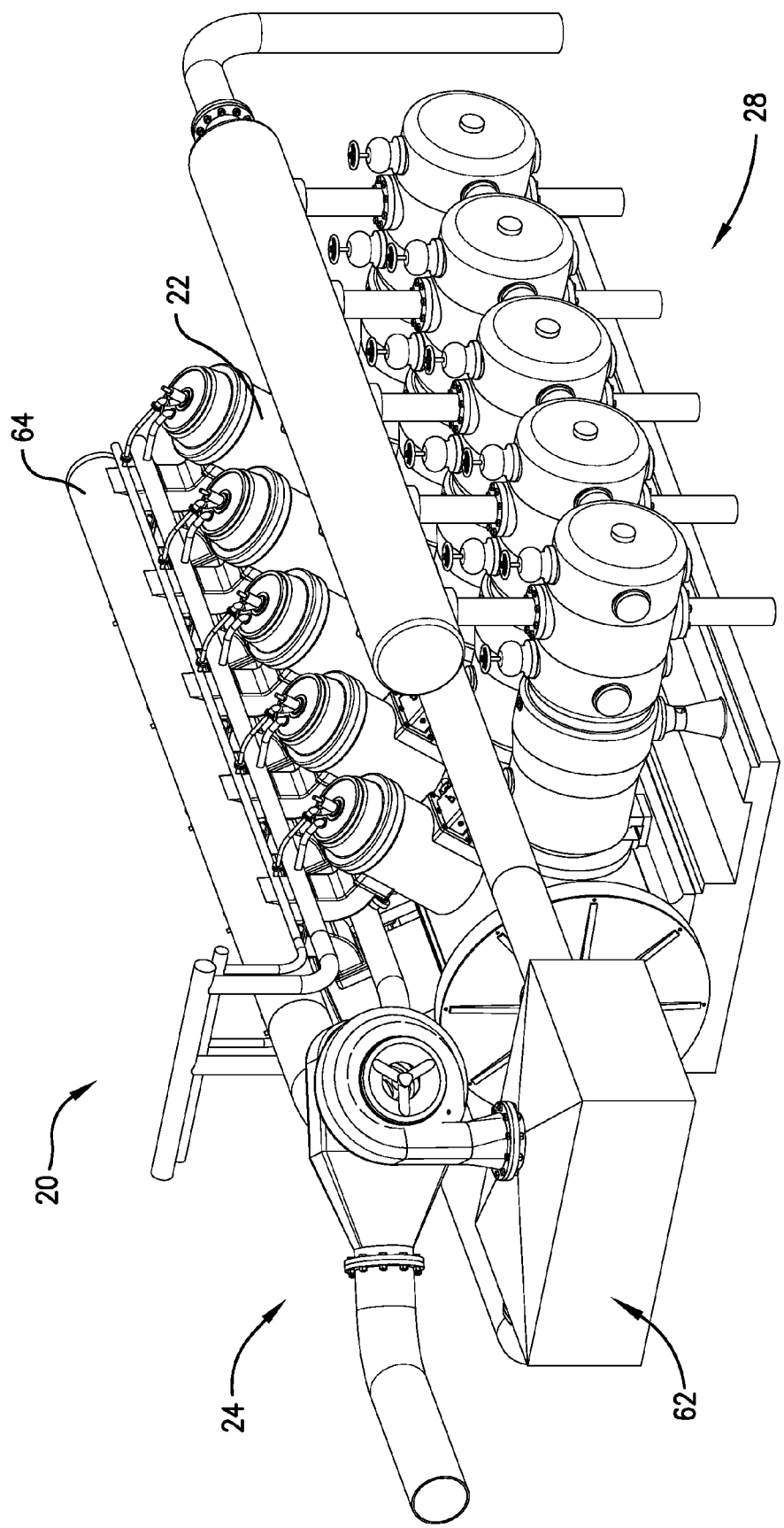
FIG. 2 is a left rear perspective of the air-balanced two-stroke engine shown in FIG. 2, showing an engine and a gas compressor assembly of the integral gas engine-compressor and a turbocharger of the air balancing system.
Figure 3:
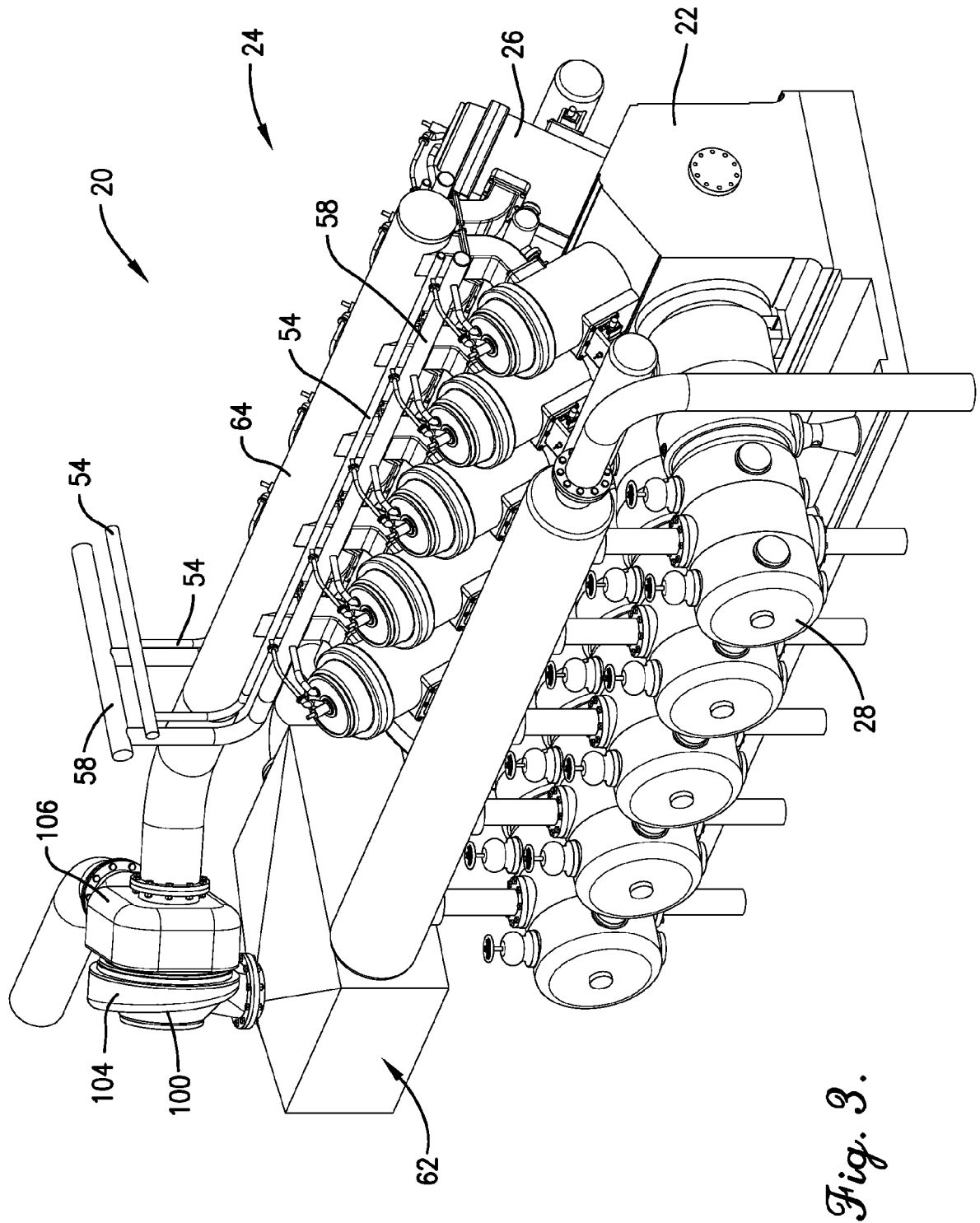
FIG. 3 is a left front perspective of the air-balanced two-stroke engine shown in FIGS. 1 and 2.
Figure 4:
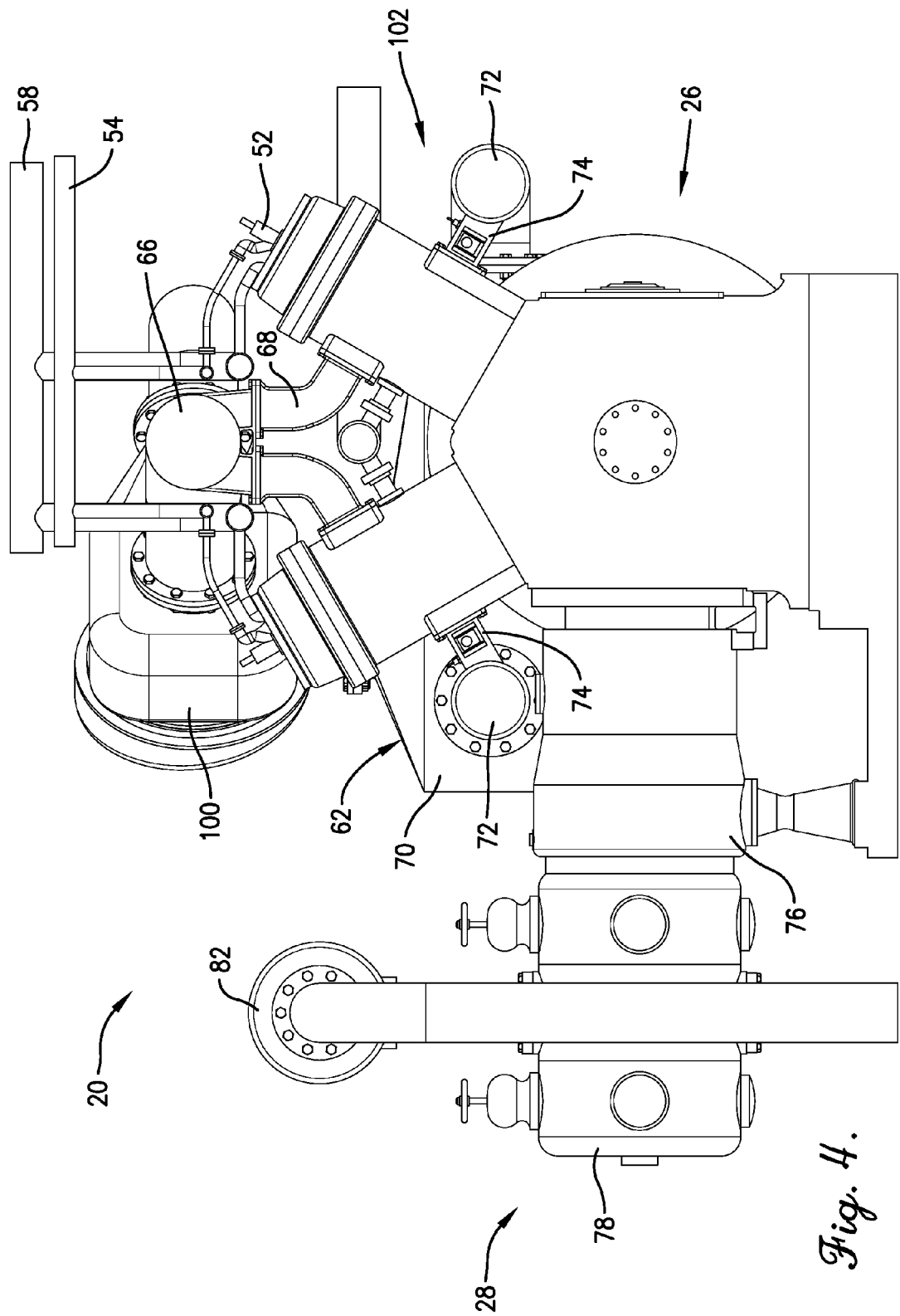
Figure 5:
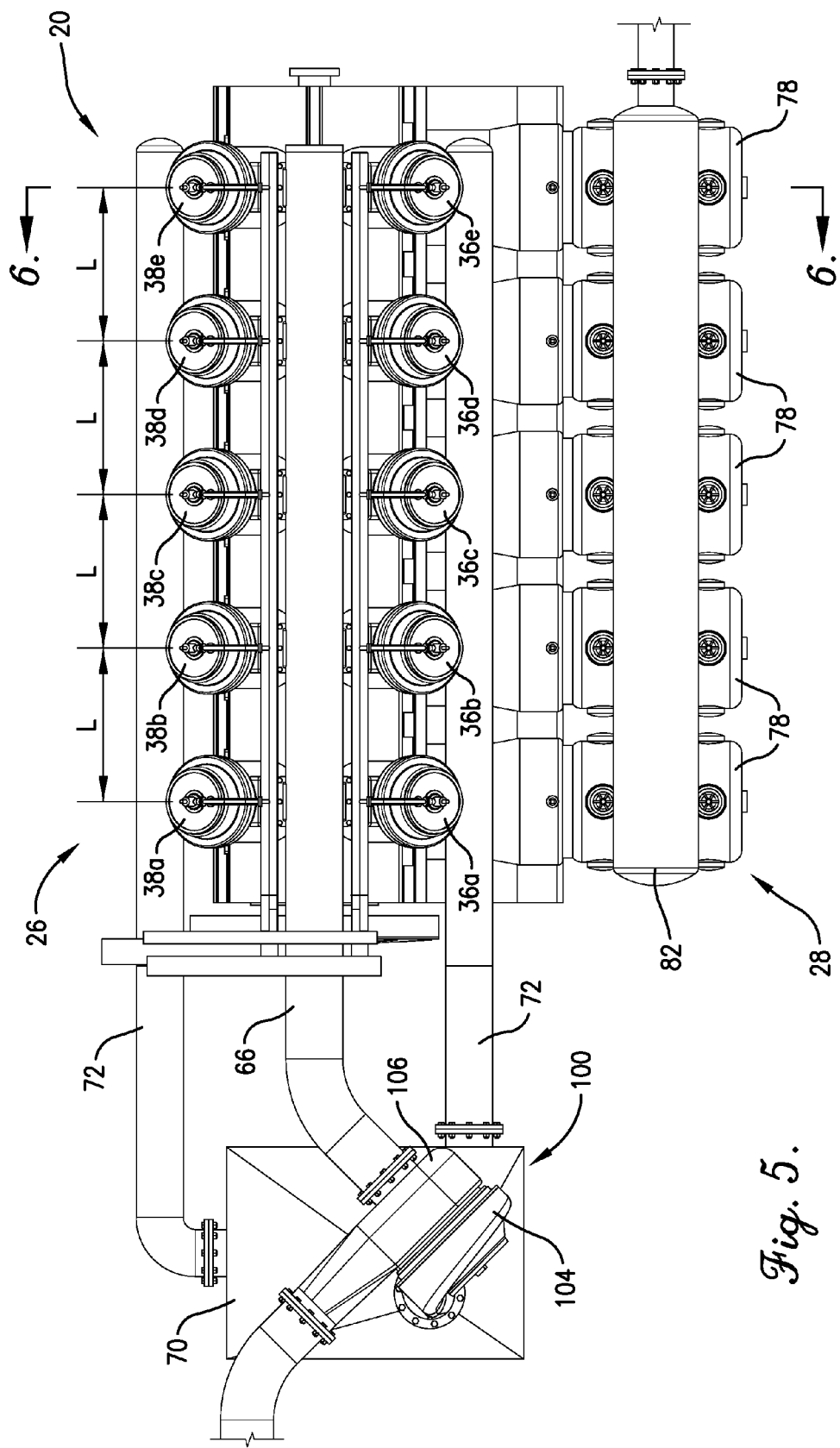

FIG. 4 is a front elevation of the air-balanced two-stroke engine shown in FIGS. 1-3, showing an engine crankcase and left and right banks of power cylinders of the engine, a pair of air intake manifolds each extending along a respective bank of power cylinders, and an exhaust manifold extending between the banks of power cylinders, and further showing cylinders of the gas compressor assembly attached to the engine crankcase;

FIG. 5 is a top view of the air-balanced two-stroke engine shown in FIGS. 1-4, showing the location of power cylinders along an axis of the engine and the location of the air intake and exhaust manifolds;

FIG. 6 is a cross section of the air-balanced two-stroke engine shown in FIGS. 1-5, showing intake runners that fluidly connect the air intake manifold and power cylinders and further showing the air balancing system with air balancing valves and mass flow sensors installed in respective intake runners;

FIG. 7 is a fragmentary perspective of the air-balanced two-stroke engine shown in FIGS. 1-6, showing one of the air balancing valves and mass flow sensors installed in the respective intake runner, with the air balancing valve in a partly open valve position;

FIG. 8 is a fragmentary side elevation of the air-balanced two-stroke engine shown in FIGS. 1-7, showing the air balancing valve and mass flow sensor installed in the respective intake runner, with the air balancing valve in a closed valve position; and FIG. 9 is a fragmentary top view of the air-balanced two-stroke engine shown in FIGS. 1-8, showing the air balancing valve in the partly open valve position and the mass flow sensor.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Turning initially to FIGS. 1-3, an air-balanced gas engine assembly 20 is operable to compress and transmit natural gas along a natural gas transmission line (not shown). The engine assembly 20 is particularly suited to operate efficiently while producing a minimal amount of harmful gas emissions, such as $NO_X$ emissions, from engine operation. The illustrated engine assembly 20 is preferably used for gas transmission, but the principles of the present invention are applicable for other internal combustion engine applications, such as marine power, electricity generation, and other industrial power applications, that require an efficient and low-emission internal combustion engine. The air-balanced gas engine assembly 20 broadly includes an integral gas engine-compressor 22 and an air balancing system 24.

Turning to FIGS. 2-6, the integral gas engine-compressor 22 is fluidly coupled to the natural gas transmission line to compress and transmit natural gas. The illustrated integral gas engine-compressor 22 broadly includes a reciprocating two-stroke internal combustion engine 26 and a gas compressor assembly 28. The illustrated engine-compressor 22 is a Cooper GMV integral engine, but could be another type of integral gas engine-compressor. Also, it is within the ambit of the present invention where the engine-compressor 22 comprises a reciprocating engine without a gas compressor. Furthermore, the principles of the present invention are equally applicable to four-stroke engines as well as the illustrated two-stroke internal combustion engine 26.

The internal combustion engine 26 is a conventional large-bore engine, i.e, an engine much larger than a conventional automotive engine, and serves to power the gas compressor assembly 28. In the usual manner, the internal combustion engine 26 includes a crankcase 30 and a crankshaft 32 rotatably mounted in the crankcase 30. The engine 26 further includes cylinder heads 34 mounted on the crankcase 30 to provide a left side cylinder bank 36, with cylinders 36a,b,c,d,e spaced along an engine axis, and a right side cylinder bank 38, with cylinders 38a,b,c,d,e also spaced along the engine axis. For each cylinder bank 36,38, adjacent cylinders present a spacing L between cylinder center lines of about forty-eight (48) inches. The cylinders 36a,b,c,d,e and cylinders 38a,b,c,d,e each present a combustion chamber 40 and intake and exhaust ports 42,44 that fluidly communicate with the combustion chamber 40. The engine 26 further includes pistons 46 slidably received in the chambers 40 and drivingly connected to the crankshaft 32 by power connecting rods 48. The illustrated pistons 46 have a piston diameter of about fourteen (14) inches. The crankshaft 32 and power connecting rods 48 cooperatively provide a throw of about fourteen (14) inches. However, the pistons 46 and other components of the engine 26 could be alternatively sized without departing from the scope of the present invention.

The engine 26 also includes a gas fuel system 50 with gas injection valves 52 fluidly communicating with the chambers 40 and fuel supply lines 54 that provide gas to the gas injection valves 52. The engine 26 further includes a cooling system 56 with lines 58 that carry cooling fluid to and from passages in the crankcase 30 and cylinder heads 34. A foundation 60 receives the crankcase 30 and thereby supports the engine 26.

Furthermore, the engine 26 includes an intake assembly 62 and an exhaust assembly 64 that fluidly communicate with intake and exhaust ports 42,44. The exhaust assembly 64 includes an exhaust manifold 66 that extends along the engine axis between the cylinder banks 36,38. In the usual manner, the exhaust manifold 66 is fluidly connected to the exhaust ports 44 by exhaust runners 68 so that exhaust gases flow out of the cylinders, through respective exhaust runners 68, and then through the exhaust manifold 66.

The intake assembly 62 includes a plenum 70, a pair of intake manifolds 72 fluidly connected to the plenum 70 at manifold inlets, and a plurality of intake runners 74. The intake manifolds 72 each present a diameter of about twelve (12) inches and a manifold length that ranges from about twelve (12) feet to about twenty (20) feet, but the manifolds 72 could be alternatively sized. The illustrated engine 26 has been found to operate with intake manifold air flow rates that range from about 498 scfm to about 643 scfm and manifold static pressures that range from about 6.7 psig to about 9.2 psig. The intake runners 74 fluidly connect the intake manifolds 72 and the intake ports 42, with intake air being configured to flow from the plenum 70, flow downstream through the intake manifolds 72, and then into the cylinders by passing through respective intake runners 74.

The conventional engine 26 combines intake air from the intake assembly 62 and fuel from the gas fuel system 50 in the cylinders to support combustion, with the air flow rate, the fuel flow rate, and the scavenging efficiency of each cylinder providing a trapped equivalence ratio $\phi$. The trapped equivalence ratio $\phi$ is the ratio of the actual fuel-to-air ratio in the cylinder to the stoichiometric fuel-to-air ratio. Importantly, it has been determined that $NO_X$ production is a function of trapped equivalence ratio $\phi$. As will be discussed in greater detail, the present invention is configured to substantially balance air flow among cylinders and is configured to substantially equalize the trapped equivalence ratio $\phi$ among cylinders.

Turning to FIGS. 4-6, the gas compressor assembly 28 is conventional and includes a compressor housing 76 attached to the crankcase 30 and supported by the foundation 60. The compressor housing 76 includes a plurality of compressor cylinders 78 spaced along the engine axis and extending in a lateral direction. The cylinders 78 present ports 80 that fluidly communicate with a gas manifold 82. The gas compressor assembly 28 also includes double-acting pistons 84 slidably received in respective cylinders 78. The pistons 84 are each drivingly connected to the crankshaft 32 by a compressor rod 86, a crosshead 88, and a master connecting rod 90 so that rotation of the crankshaft 32 causes the pistons 84 to reciprocate and compress natural gas in the usual manner.

Turning to FIGS. 7-9, the illustrated intake runners 74 include a wall 92 that presents a passage 94, and an inlet 96 and outlet 98 that are fluidly connected by the passage 94. While the illustrated passage 94 has a rectangular cross section, the passage 94 could have an alternative cross-sectional shape, such as a circular shape. The rectangular cross section presents a passage width W of about ten (10) inches and a passage height H of about five (5) inches to provide an actual flow area of about 50 square inches when measured perpendicular to the passage axis. However, the passage 94 could have different dimensions. While each cylinder 36,38 is preferably attached to a corresponding intake runner 74 so that each intake port 42 is thereby in direct fluid communication with a corresponding passage 94, the principles of the present invention are applicable where one or more cylinders 36,38 are each directly attached to and receive intake air via multiple intake runners 74. Furthermore, one more of the intake runners 74 could provide intake air to multiple cylinders 36,38, e.g., where the intake runner 74 has a single air inlet 96 and multiple air outlets 98, with each air outlet 98 being in fluid communication with a respective intake port 42.

The illustrated engine 26 has been found to normally produce imbalanced intake air flows among power cylinders. The cylinders are spaced along the downstream manifold direction, with more intake air generally being provided to upstream cylinders, such as cylinders 36a,38a, and less intake air generally being provided to downstream cylinders, such as cylinders 36e,38e. It has been found that each intake port 42, intake runner 74 and the intake manifold 72 cooperatively provide an air intake restriction, which imparts a corresponding pressure drop in air flow, from the manifold inlet to the corresponding intake port 42. Due to the shape and size of the intake manifolds 72 and intake runners 74, the air intake restrictions are generally different for each of the cylinders 36a,b,c,d,e. For instance, the air intake restriction for cylinder 36a is less than the air intake restriction for cylinder 36e because air travels a shorter distance to cylinder 36a compared to cylinder 36e, i.e., cylinder 36e is spaced about 16 feet farther downstream than cylinder 36a. Consequently, the pressure and mass flow rate of intake air supplied to cylinder 36a tends to be greater than the pressure and mass flow rate of air supplied to cylinder 36e. For example, it has been found that a steady-state pressure drop of about 3 inches Hg to about 5 inches Hg occurs from cylinder 36a to cylinder 36d. Similarly, each of the cylinders 38a,b,c,d,e is associated with different air intake restrictions.

The imbalance of air intake restrictions across cylinders 36,38 has been found to contribute to an imbalance of air flow into the cylinders 36,38 of the conventional engine 26, with a corresponding imbalance of trapped equivalence ratio $\phi$. Furthermore, it is apparent that cylinders should be independently controlled to overcome this imbalance. As will be discussed further, elements of the air balancing system 24 are operably coupled to the intake runners 74 and serve to selectively open and close each of the passages 94 to control intake air flow to the intake ports 42. In this manner, the air balancing system 24 serves to correct the imbalance of pressure and air flow rate created by the air intake restrictions, and is configured to equalize the trapped equivalence ratio $\phi$ among cylinders.

It has also been determined that conventional fuel control systems, which are designed to reduce emissions, do not effectively balance trapped equivalence ratio $\phi$. Fuel control systems generally monitor peak cylinder pressures and attempt to balance peak cylinder pressures by injecting more fuel when the cylinder pressure is low or injecting less fuel when the cylinder pressure is too high. Again, the variable intake restrictions discussed above normally result in more intake air being delivered to upstream cylinders, with those cylinders having a relatively high cylinder pressure, and less intake air being delivered to downstream cylinders, with those cylinders having a relatively low cylinder pressure. In response to the imbalanced cylinder pressures, fuel control systems attempt to balance pressures by reducing the fuel injected into upstream cylinders (i.e., the cylinders with more intake air) and increasing the fuel injected into downstream cylinders (i.e., the cylinders with less intake air). Once the fuel control system has balanced peak cylinder pressure, upstream cylinders will have a very lean fuel-to-air mixture and downstream cylinders will have a very rich fuel-to-air mixture. Consequently, fuel control systems have been found to produce an imbalance in trapped equivalence ratio $\phi$ and $NO_X$ production among cylinders.

Turning to FIGS. 3-9, the air balancing system 24 is configured to control air intake flow into the engine 26 and exhaust flow from the engine 26. The air balancing system 24 broadly includes a turbocharger 100 and an intake balancing assembly 102. The illustrated turbocharger 100 includes a centrifugal compressor 104 and a turbine 106 that drives the compressor 104. In the usual manner, the compressor 104 includes an axial inlet that receives ambient air and a radial discharge that fluidly communicates with and discharges compressed air into the plenum 70. However, the compressor 104 could be alternatively configured without departing from the scope of the present invention.

The turbine 106 includes an axial inlet that is configured to receive engine exhaust gases and a radial discharge through which the engine exhaust gases exit the turbine 106. The inlet of the turbine 106 is fluidly attached to the exhaust manifold 66 and receives engine exhaust gases from the exhaust manifold 66. The illustrated turbocharger preferably includes variable compressor vane geometry that can be adjusted to permit efficient engine and turbocharger operation under a range of environmental conditions. Additional features of this preferred turbocharger 100 are disclosed in greater detail in the above-incorporated U.S. patent application entitled VARIABLE GEOMETRY TURBOCHARGER.

While the illustrated turbocharger 100 is preferred, a conventional turbocharger could be used with the engine 26, or another type of supercharger could be used, such as a blower driven by the crankshaft 30. Also, the principles of the present invention are applicable where the engine 26 is not provided with a supercharger, or where multiple superchargers supply compressed air to the engine 26. While the turbocharger 100 generally serves to increase intake air flow to all cylinders 36,38, it is also within the ambit of the present invention where one or more superchargers are configured to selectively provide different amounts of intake air to particular cylinders to correct the imbalance of pressure and mass flow rate created by the air intake restrictions.

The air balancing system 24 could also include other components for augmenting intake air flow to the engine 26, such as an intercooler. In particular, a preferred turbocharger boosting system (not shown) can be operably coupled to the turbine 106 of turbocharger 100 to increase the amount of heat into the turbine 106 and thereby increase the compressor speed to provide additional intake air flow to the engine 26. In particular, the turbocharger boosting system includes a gas burner (not shown) operable to be installed in the exhaust assembly 64, e.g., in the exhaust manifold 66 adjacent the turbine 106, to add heat to the exhaust gases prior to the exhaust gases reaching the turbine 106. Additional details of the preferred turbocharger boosting system are disclosed in the above-incorporated U.S. patent application entitled TURBOCHARGER BOOSTER SYSTEM.

Turning again to FIGS. 7-9, the intake balancing assembly 102 broadly includes valves 108, valve actuators 110, and air velocity sensors 112. The valve actuator 110 preferably includes an electric motor, such as a servo, and a mounting bracket, with the motor being mounted to the side of the intake runner 74 and drivingly attached to the valve 108.

The air velocity sensor 112 is preferably a hot wire anemometer operable to measure air flow velocity, and is installed in the illustrated intake runners 74. Additionally, a static pressure sensor and temperature sensor (both not shown) are also installed in each intake runner 74. The velocity sensor 112, pressure sensor, and temperature sensor are configured to cooperatively provide a mass flow sensor assembly to measure the mass flow rate of air through the corresponding intake runner 74. In particular, the temperature and pressure sensors are used to determine the air density, and the velocity measurement and runner size determine the volumetric air flow rate. However, it is also within the scope of the present invention to use other types of flow meters, such as a vane air flow meter or a Karmen vortex meter, to determine the air mass flow rate. Furthermore, while the illustrated sensor 112 is preferably installed in the intake runner 74, flow measurements can be taken at other locations to determine air mass flow rate. By measuring the air mass flow rate, the illustrated intake balancing assembly 102 can be used to determine the amount of trapped air mass in each cylinder 36,38. However, trapped air mass can be determined using other methods and sensors without departing from the scope of the present invention. For example, trapped air mass can be calculated by measuring in-cylinder compression pressures during engine operation.

Each valve 108 is preferably associated with a corresponding intake port 42 and cylinder and includes a throttle plate 114 attached to a rod 116. The throttle plate 114 is pivotally mounted in a corresponding intake runner 74 by mounting ends of the rod 116 in bushings 118. The throttle plate 114 preferably comprises a flat plate with an outermost rectangular edge and presents a plate width PW and a plate height PH. The throttle plate 114 preferably has a thickness of about one-eighth (⅛) inch, a plate width PW of about eight (8) inches, and a plate height PH of about three (3) inches. The throttle plate 114 is positioned within the passage 94 so that the edge extends along the inner surface of the wall 92 of the intake runner 74. In this manner, the throttle plate 114 and intake runner 74 cooperatively form an annular gap G that surrounds the throttle plate 114.

The valve 108 is preferably pivotal from a closed position, where the throttle plate 114 is positioned substantially perpendicular to the axis of the passage 94 to minimize the annular gap G, to a fully open position, where the throttle plate 114 extends substantially parallel to the passage axis to maximize the annular gap G. In the closed position, the annular gap G preferably presents a substantially constant gap width about the throttle plate 114 of about one (1) inch (see FIG. 8). As discussed above, the passage presents a passage flow area of about 50 square inches. In the closed position, the throttle plate 114 presents an effective plate area, measured perpendicular to the passage axis, of about 24 square inches. Consequently, the effective plate area is about half of the passage flow area when throttle plate 114 is in the closed position. As the throttle plate 114 is opened, the effective plate area decreases. While it has been found that this valve configuration permits a desired range of valve operation, the annular gap G could be alternatively sized without departing from the scope of the present invention.

The illustrated valve 108 operates as a variable flow restriction in the passage 94. In particular, the valve 108 is configured to produce a maximum pressure drop that ranges from about 4 inches Hg to about 6 inches Hg. In other words, the valve 108 provides an effective flow area of the passage 94, which is a product of the actual flow area of the passage 94 and an experimentally determined discharge coefficient of the valve 108. The intake ports 42 of the cylinders also have a non-dimensional discharge coefficient that can be calculated based on port open fraction. For the illustrated engine 26, the intake port discharge coefficients alone range from about 0.3 to about 0.4. In combination, the intake port 42 and the valve 108 have a discharge coefficient that ranges from about 0.076 to about 0.14, with these values corresponding to the valve 108 being in the closed position and the open position, respectively. These values were determined over intake manifold air flow rates that range from about 500 scfm to about 600 scfm and manifold static pressures that range from about 7.0 psig to about 9.0 psig.

As the valve 108 swings from the closed position to the open position, the effective flow area gradually increases. It has been determined that the change in effective flow area is directly proportional to the actual air mass flow rate. In particular, a 10% change in effective flow area results in a 10% change in air mass flow rate. Furthermore, the illustrated valve 108 permits a variation of air mass flow rate through each passage 94 of about 12.4%. It has been surprisingly discovered that a 10% variation in air mass flow rate results in a variation in $NO_X$ production of up to about 85% for the illustrated engine 26. Moreover, a variation in air mass flow rate over a range of about 5% to about 12% results in a variation in $NO_X$ production over a range of about 65% to about 92%.

While each valve 108 controls flow through a single corresponding passage 94 and into a corresponding intake port 42, the principles of the present invention are applicable where multiple valves 108 are used to control air intake flow through one of the passages 94 and into the corresponding intake port 42. Furthermore, a single valve 108 could control air intake flow through multiple passages 94 and into multiple intake ports 42, particularly where such a configuration serves to balance intake air flow among multiple cylinders 36,38.

The intake balancing assembly 102 is used to balance intake air flow among the cylinders and is configured to substantially equalize trapped equivalence ratio φ among the cylinders. In particular, the mass flow sensor assemblies are operable to take air flow measurements in each passage 94 to determine the air mass flow rate into each intake port 42. The measured mass flow rates can then be compared, either manually or automatically, to adjust the valves 108 relative to one another. For instance, one valve 108 could be opened to permit additional flow through the corresponding passage 94 where the flow rate through that passage 94 is not as high as the flow rate in another passage 94. Similarly, another valve 108 could be closed to further restrict flow through the corresponding passage 94, where the flow rate through that passage 94 is too high compared to the flow rate in another passage 94. Furthermore, multiple valves 108 can be adjusted at the same time to adjust flow rates in multiple passages 94. It is within the scope of the present invention where such adjustments are made either manually or automatically.

While the assembly 102 is configured to substantially equalize the air mass flow rates and the trapped air mass in each cylinder, the principles of the present invention are applicable where the assembly 102 provides different air flows to each cylinder to substantially equalize the trapped equivalence ratios. Also, the illustrated assembly 102 is configured to be operably coupled with the gas fuel system 50 to cooperatively control and equalize trapped equivalence ratios. For instance, the gas fuel system 50 can adjust the fuel flow rate into one or more selected cylinders, with the valves 108 also adjusting air flow into one or more selected cylinders. Such adjustments could be made simultaneously to equalize trapped equivalence ratios.

The intake balancing assembly 102 is typically installed as an aftermarket upgrade to the engine 26, but could be installed as part of an original equipment engine package. In particular, the illustrated engine 26 and other similar engines present a severely confined space, i.e., along the intake runners 74, between the intake manifold 72 and corresponding cylinders. However, the valves 108 and sensors 112 are specifically configured to be installed and operate in the confined location between the intake manifold 72 and the corresponding cylinders without altering the intake manifold 72 and the cylinders. In this manner, the intake balancing assembly 102 has been found to provide a relatively low-cost aftermarket solution for improving engine performance.

In operation, engine performance is monitored by the intake balancing assembly 102. The assembly 102 can measure intake air flow rates into the cylinders. Furthermore, the measured values can be compared and used to adjust the assembly 102, e.g., by controlling the position of one or more valves 108, to balance the air flow rates among the cylinders. The balancing process can be conducted generally for changes in engine load or environmental conditions, such as ambient temperature or humidity. Furthermore, the process can be conducted at periodic intervals or dynamically as changes occur.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A method of controlling a reciprocating internal combustion engine, with the engine comprising a plurality of power cylinders and an intake manifold fluidly coupled with the power cylinders via a plurality of air intake runners, said method comprising the steps of:
   (a) providing the intake runners between the intake manifold and respective power cylinders to transmit intake air flows to corresponding power cylinders, with each intake runner having an adjustable intake air flow restriction;
   (b) determining an operational air flow rate of at least one of the intake air flows during engine operation; and
   (c) balancing trapped equivalence ratio among the power cylinders by selectively adjusting at least one of the adjustable intake air flow restrictions to change the at least one intake air flow.

2. The method as claimed in claim 1,
step (b) including the step of determining the operational air flow rate of multiple ones of the intake air flows received by corresponding power cylinders during engine operation; and
   (d) comparing the determined operational air flow rates.

3. The method as claimed in claim 2,
each of said adjustable intake air flow restrictions including an air intake valve,
step (c) including the step of adjusting the air intake valves to substantially equalize the operational air flow rates among the air intake valves.

4. The method as claimed in claim 3,
step (c) including the step of adjusting the air intake valves to substantially equalize the trapped air mass among the power cylinders.

5. The method as claimed in claim 2,
step (c) being performed when the determined operational air flow rates compared in step (d) are different from one another.

6. The method as claimed in claim 5,
each of said adjustable intake air flow restrictions including an air intake valve,
step (c) including the step of selectively adjusting at least one of the adjustable intake air flow restrictions to change the multiple ones of the intake air flows.

7. The method as claimed in claim 6,
step (c) including the step of adjusting the air intake valves to substantially equalize the operational air flow rates among the air intake valves.

8. The method as claimed in claim 2,
step (b) including the step measuring the air flow rate of each of the intake air flows to determine a corresponding operational air flow rate.

9. The method as claimed in claim 2,
step (c) including the step of adjusting a fuel balancing element in response to step (d) to change the operational fuel flow rate into the corresponding at least one power cylinder.

10. The method as claimed in claim 9,
wherein the step of adjusting at least one of the adjustable intake air flow restrictions and the step of a fuel balancing element are performed simultaneously to balance trapped equivalence ratio among the power cylinders.

* * * * *